Oct. 9, 1962 W. P. EBNER 3,056,998
CONTACT LENS CARRYING CASE
Filed March 24, 1960

INVENTOR.
WALTER P. EBNER
BY
Anderson, Spangler & Wymore
ATTORNEYS

United States Patent Office 3,056,998
Patented Oct. 9, 1962

3,056,998
CONTACT LENS CARRYING CASE
Walter P. Ebner, Denver, Colo., assignor of one-half to Edwin L. Spangler, Jr., and Max L. Wymore, both of Denver, Colo.
Filed Mar. 24, 1960, Ser. No. 17,347
9 Claims. (Cl. 15—512)

This invention relates to a carrying case for contact lenses and more particularly to such a case which is liquid-tight having therein protective holders for the lenses in which they may be placed, when not in use, and wetted with a suitable protective solution until they are removed for wearing.

Cases for contact lenses presently in use are of the dry type and are merely for holding the dry lenses. The user of these prior art cases must be on constant guard, when opening same to remove the lenses, to avoid loss or damage to them. Since contact lenses are very small, thin and lightweight, they are easily damaged or lost. The wearer must always be careful not to scratch the lenses against these prior art cases when removing them. When the lenses are out of the case, the wearer must apply a cleansing solution over the lenses from a bottle carried on his person. When the lenses are removed and stored, they must be cleansed of tear drops, as the lens will be stained by salt deposited therefrom.

Manufacturers of contact lenses recommend that the lenses should never be wiped dry but should be immersed in a suitable solution when not in use in order to preserve the polish. Most people carry their contact lenses with them at all times and find it difficult to immerse them when not in use.

It is an object of this invention, therefore, to provide an improved contact lens carrying case which is liquid-tight and which is provided with a liquid storage compartment communicating with each lens location and adapted to contain a suitable solution maintained in contact with the lenses when stored in the case.

In accordance with the invention, the improved contact lens carrying case comprises a container defining a chamber with end walls of the container having openings therethrough, lens holding means attached to the container and in communication with the chamber defined thereby through the openings in the end walls thereof.

For a better understanding of the present invention, together with other and further objects thereof, reference is had to the following description taken in connection with the appended claims.

Figure 1:
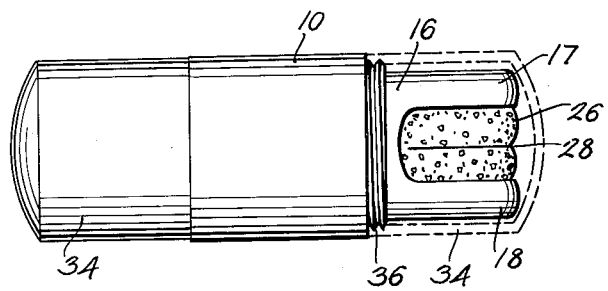
FIGURE 1 is a view in elevation of the case of the instant invention with an end cap removed.

Referring to the drawings, the invention is illustrated as taking the form of a case for contact lenses which comprises an elongated generally cylindrical container 10 which is made of suitable liquid-tight material, such as plastic. End walls 11 and 12 are provided at either end, each having an opening 13 and 14 respectively therethrough. A lens holder generally identified as 16 is secured to container 10 adjacent an end wall. The lens holder is seen to be of bifurcated configuration comprising a pair of hollow fingers 17 and 18 attached to a base 20 having an aperture 22 therethrough. The lens holder 16 is secured to container 10 by means of threads 24, or other suitable means such that aperture 22 communicates with the interior of container 10.

Figure 3:
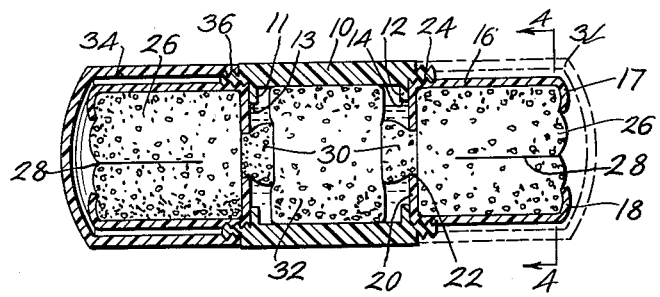
FIGURE 3 is a cross-sectional view in elevation of one embodiment of the invention.
Figure 4:
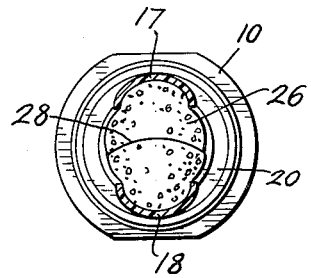
FIGURE 4 is a view along line 4—4 of FIGURE 3.

The hollow of fingers 17 and 18 and the space therebetween is filled with a pad 26 of a liquid-absorbing material, such as porous rubber or plastic sponge. A cut 28 is provided in pad 26 approximately mid-way between fingers 17 and 18 and may be curved in at least one direction, FIGURES 2 and 4, to improve contact with the lens and provide better wiping action. A portion of pad 26 is seen to protrude through aperture 22 in base 20 forming a protuberance 30 positioned within the interior of container 10. The interior of container 10 may be substantially filled with a block or plug 32 of liquid-absorbent material similar to pad 26. It will be seen that in FIGURE 3, the protuberances 30 are in intimate contact with plug 32. An end cap 34 is removably secured to container 10 in liquid-tight relation by threads 36 or like means.

Figure 2:
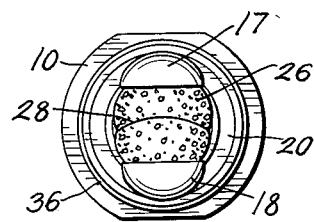
FIGURE 2 is an end view from the end with the cap removed.
Figure 5:
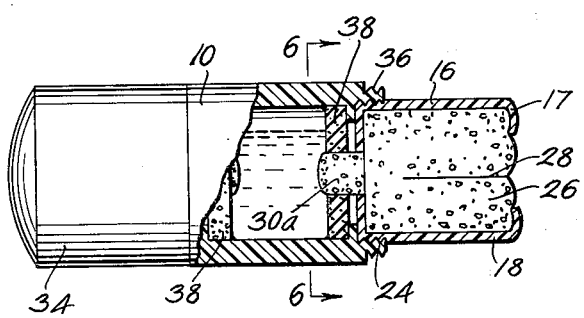
FIGURE 5 is an elevational view partly in cross-section of another embodiment of the invention.
Figure 6:
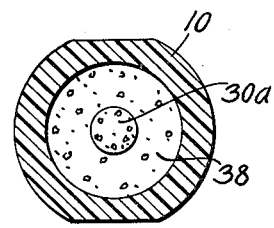
FIGURE 6 is a view along line 6—6 of FIGURE 5.

The embodiment illustrated in FIGURE 5 uses a washer 38 of liquid-absorbent material sized to fit the internal diameter of container 10 and having a central opening sized to receive protuberance 30. As best seen in FIGURES 2, 5 and 6, the top and bottom of container 10 and matching portions of caps 34 may be slightly flattened to prevent rolling when placed on a flat surface.

In use, one lens holder is removed from container 10 to expose the interior thereof. A cleansing and/or soaking solution is deposited in the interior, soaking into plug 32 or filling the reservoir between washers 38. On replacing the lens holder, the solution will be drawn into the liquid absorbing material of pad 26 thoroughly wetting same. Container 10 may be made of a flexible plastic, such as a polyethylene plastic or the like and with slight finger pressure the liquid will be more positively forced into the pad 26.

Fingers 17, 18 and pad 26 are sized and shaped such that when a lens is inserted into cut 28, the edge of the lens may be gripped between the fingers for removal. With pad 26 wetted with the solution from container 10, each lens is soaked and cleansed when inserted into the holder and kept moist until removed. On removal, a gentle wiping action takes place removing excess soaking solution.

While there have been described what are, at present, considered to be the preferred embodiments of this invention, it will be obvious to those skilled in the art that various modifications and changes may be made therein without departing from the invention. It is aimed, therefore, in the appended claims to cover all such changes and modifications which fall within the true spirit and scope of the invention.

What is claimed is:

1. A carrying case for supporting contact lenses comprising interconnected axially aligned sections forming an integral structure including a centrally positioned relatively flexible resilient section defining a cavity adapted to releasably hold a treating solution for contact lenses, a lens holding and retaining section attached to each end of the centrally positioned section, each said lens holding section including a liquid-absorbent lens holding means in liquid communication with said centrally positioned section to receive liquid therefrom into the lens holding means and cover means removably attached to each end of the centrally positioned section to provide a liquid-tight closure for the respective lens holding and retaining section and the centrally positioned section.

2. A carrying case according to claim 1 wherein the end walls of the centrally positioned section are each provided with an aperture, a portion of each said liquid-absorbent lens holding means being positioned within the aperture and each said respective lens holding means further having a cut therein of a size sufficient to receive a contact lens therein in frictional engagement therewith.

3. A lens carrying case according to claim 1 wherein each said lens holding and retaining section includes a pair of spaced, substantially parallel fingers, the respective liquid-absorbent lens holding means being positioned therebetween and having a cut therein intermediate and substantially parallel to the fingers of a size sufficient to frictionally receive a contact lens.

4. A lens carrying case according to claim 2, wherein the cut in the lens holding means is curved in at least one direction.

5. A carrying case according to claim 2, wherein the cavity of the centrally positioned section is substantially entirely filled with a liquid-absorbent material in intimate contact with the said portion of each lens holding means within the aperture.

6. A lens carrying case according to claim 2, wherein the said portion of each of the lens holding means extends through the aperture and a liquid-absorbent washer is positioned within the cavity of the centrally positioned section to receive each said portion in intimate relation.

7. A lens carrying case according to claim 3, wherein each said liquid-absorbent lens holding means is resilient, the width thereof and the cut therein being not less than the nominal diameter of a contact lens with the fingers being of a width less than the nominal diameter of a contact lens such that a contact lens held edge-wise between a user's fingers may be positioned within the cut and removed while so held.

8. A contact lens carrying case comprising interconnected sections forming an integrated structure including a relatively flexible resilient section adapted to releasably retain a treating solution, a contact lens holding and retaining section attached to an end of the resilient section defining a pair of spaced substantially parallel fingers having positioned therebetween a pad of resilient liquid-absorbent material provided with a cut normal to a plane including the fingers and being of a size sufficient to receive and frictionally hold a contact lens therein and cover means detachably connected to said resilient section to provide a closure for the lens holding and retaining section and said resilient section.

9. A carrying case according to claim 8, wherein said contact lens holding and maintaining section is in liquid communication with said relatively flexible resilient section to receive liquid therefrom into said pad of resilient liquid-absorbent material.

References Cited in the file of this patent

UNITED STATES PATENTS

| 211,104 | Mulford | Jan. 7, 1879 |
| 1,708,728 | Kilbride | Apr. 9, 1929 |
| 2,097,266 | Vosbikian et al. | Oct. 26, 1937 |
| 2,227,710 | Finn | Jan. 7, 1941 |
| 2,416,596 | Rosenthal | Feb. 25, 1947 |
| 2,908,923 | Schlechter | Oct. 20, 1959 |

FOREIGN PATENTS

| 285,197 | Switzerland | Dec. 16, 1952 |